April 3, 1962   G. L. MINER   3,027,906
CONTROL VALVE

Filed May 23, 1960   3 Sheets-Sheet 1

INVENTOR.
GEORGE L. MINER
BY Herman Foster
ATTORNEY

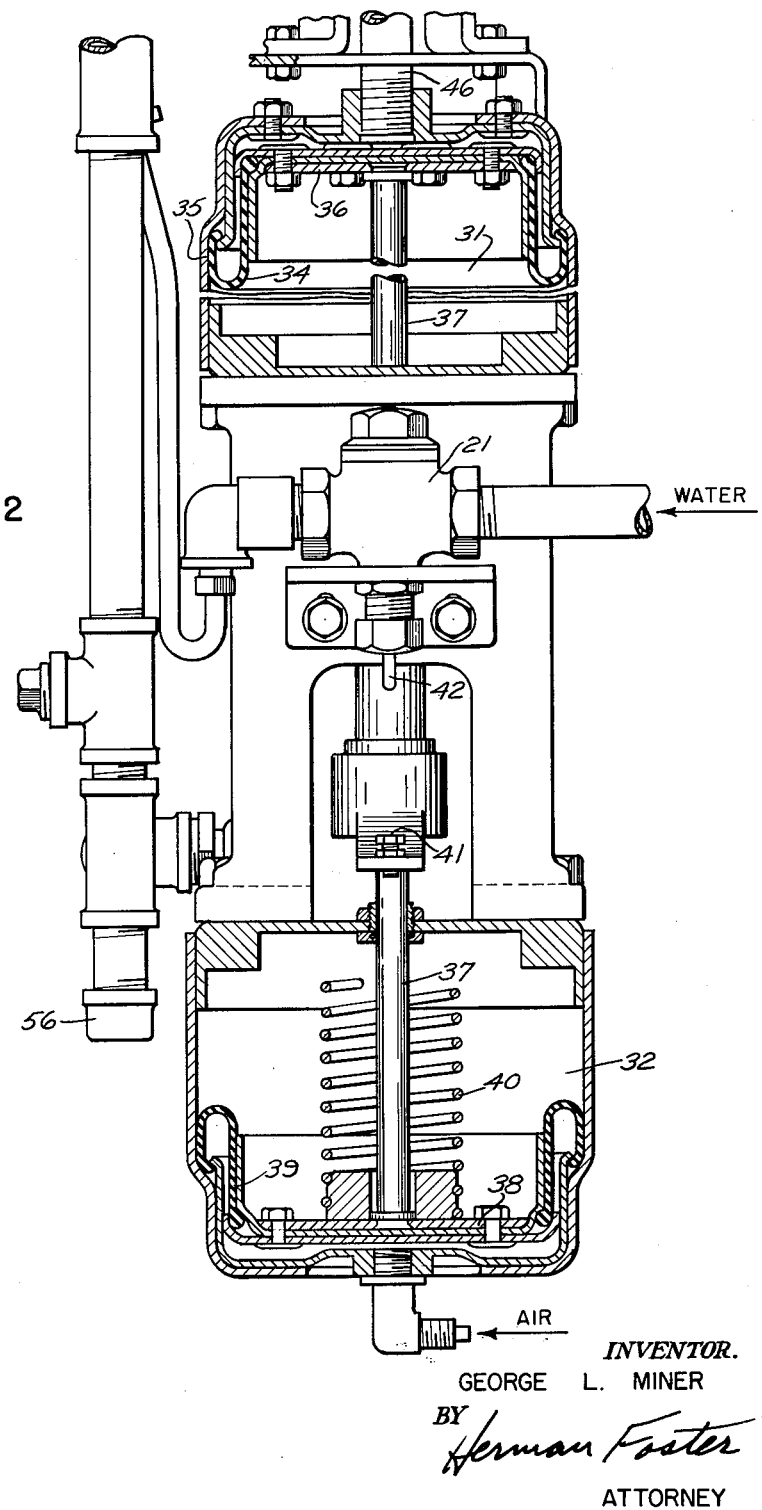

INVENTOR.
GEORGE L. MINER
BY Herman Foster
ATTORNEY

United States Patent Office 3,027,906
Patented Apr. 3, 1962

3,027,906
CONTROL VALVE
George L. Miner, Warwick, R.I., assignor to Grinnell Corporation, Providence, R.I., a corporation of Delaware
Filed May 23, 1960, Ser. No. 30,826
2 Claims. (Cl. 137—107)

This invention relates to humidifying systems and more particularly to a control valve for maintaining desired pressure differentials between gas and liquid in a system.

Humidifying atomizers fall into two categories: First there is the vacuum atomizer which operates on the same principle as a common perfume atomizer, that is the air rushing past an orifice connected to a liquid supply creates a low pressure area which draws the liquid up into the path of the air and is then dispensed as a mixture of air and liquid. The second category is that of a pressure atomizer which requires that the water head or liquid head be greater than the air pressure before the water or liquid is forced into the path of the stream of air and dispersed and carried by it. This invention is concerned with the latter category of atomizer.

A quick mathematical calculation clearly indicates that the quantity of water flowing from a pressure atomizer basically depends on the pressure differential at the interior of the outer or air orifice between the water and the air, and that if the desired pressure differential can be maintained constant for a given setting, then good control will occur. Taking the known hydraulic formula, ideal $Q=AV$ where V is the ideal velocity, A is the area, and Q is the quantity, from our energy equation we know that ideal $V=\sqrt{2gh}$; g being the gravitational acceleration of 32 ft. per sec. and $h$ the pressure differential. But, it is known that friction and contraction must be taken into account and therefore the actual discharge will be found to be $Q=C_V C_c A\sqrt{2gh}$. $C_V$ is a coefficient of velocity and $C_c$ is a coefficient of contraction. Now, this formula can be written as actual $Q=KA\sqrt{2gh}$, where $K=C_V C_c$. Looking at this formula it is obvious that K is a constant for a given atomizer, $2g$ is a constant thus the only variable present is $h$ which is the difference in head between the air and the water. Naturally, to be effective both fluids must be at a pressure higher than atmospheric.

The above mathematical derivation has been known for many years in the art and many attempts have been made to arrive at a system wherein the pressure differential between the air and water could be accurately controlled. The most commonly used arrangement to date has been to apply pressure regulators on both the water and air lines which act to regulate pressures so as to prevent them from climbing too far above a desired maximum value. However, although the maximum pressure could be controlled somewhat adequately there was very little control of the minimum pressure of either the air or the water. Another arrangement utilized an unloader on the air line which permitted the air to build up pressure to a certain point and then unloaded the compressor. The defect apparent here is that only a range of air pressure could be maintained. It is obvious that if this range could be narrowed, then the greater control on the atomizer would be obtained. Therefore it was a custom to apply a pressure reducer to be used in conjunction with the unloader, however, such an arrangement was expensive and found reluctant acceptance in the industry. Still another way to control the differential pressure between the air and the water was to maintain the air pressure with reducing valves and maintain water pressure by a centrifugal pump which gave a little better accuracy but still required that the atomizers operate within a certain range. All of these prior methods of control had a weakness apparent to all, that is, a lack of correlation between the two media.

The undesirable result of operating a pressure atomizer within a range can better be illustrated by the use of mathematical calculations which are set down below. For example: If design criteria indicated that for a given installation the atomizers should operate at a six pound (6 p.s.i.) maximum differential between air and water then utilizing one of the above prior art devices the following occurred: Utilizing a standard operating system which gives a range of air control of + or −¾ p.s.i. and a water pressure control of + or −¾ p.s.i., which is considered acceptable under the present humidifying arrangements since nothing better has been available to date, it was necessary that the controls be set in the following manner: where the line air was to enter the system at 30 p.s.i., the air reducer had to be set at 30¾ to give an operating range between 30 p.s.i. and 31½ p.s.i. Since a six pound (6 p.s.i.) maximum differential was desired the water line reducing valve had to be set at 35¼ p.s.i. to give an operating range between 34½ p.s.i. and 36 p.s.i. It is thus seen that the atomizers at times would be operating at a pressure differential of 3 p.s.i. and at other times up to 6 p.s.i. The net result being that if the operation at 6 p.s.i. was considered the point of peak efficiency, we could say that the efficiency of the atomizer would vary from a little more than 70% to 100%.

These computations therefore make clear that if a desired maximum differential could be maintained at a deside line pressure for one of the media then the atomizers would always be operating at maximum efficiency.

Another factor to be considered in these systems is the desirable range of pressure of the controlling medium (usually air) in which the system is to operate so that a proper air orifice may be selected to give a desirable spray plume, for if the differential is too great in comparison to the pressure of the medium, droplets may spew forth from the atomizer rather than a fine spray. However, the illustration here at present is concerned with flow which to date has not had adequate controls.

In pressure operated humidifying systems it is essential that as between the air and water, the water be the prime target for control because the water is generally supplied from city mains at a pressure much higher than that at which it is necessary to use it. To permit it to enter the atomizer at this city pressure would cause a solid stream of water to squirt from the atomizer which is a mishap of major proportions in a mill. It therefore has become desirable, as stated, to utilize the air as a standard by which the water is controlled.

In the prior described devices most have had absolutely no correlation between the air and water, each pressure being independently controlled, however, there has been proposed a system which utilizes an air motor and properly selected springs to maintain a selected pressure differential between air and water. The fault that lies in an arrangement such as this which rigidly maintains a set differential no matter what the controlling air pressure falls to, is that when the air pressure drops to a low figure, the differential by comparison is so great that the danger is present that water will be discharged in a spray so coarse as almost to amount to a stream. Further this last proposal ties the air and water lines together in such a manner that it requires bleeders and drains which are costly and wasteful. Applicant, has conceived a novel and useful approach which eliminates all of the above defects and presents an accurate control to the humidifying art.

It is an object of applicant's invention to accurately control the pressure differential between air and water entering a humidifying nozzle.

It is a further object to accurately vary this pressure differential in accordance to the increase or decrease in the air pressure.

Another object is to provide a device which will accomplish the above objects without wastefully draining water except under emergency conditions.

Other objects will become apparent from a perusal of the following specification and the attached drawings in which:

FIGURE 2 is a partially cut away front elevation of my invention.

Figure 1:
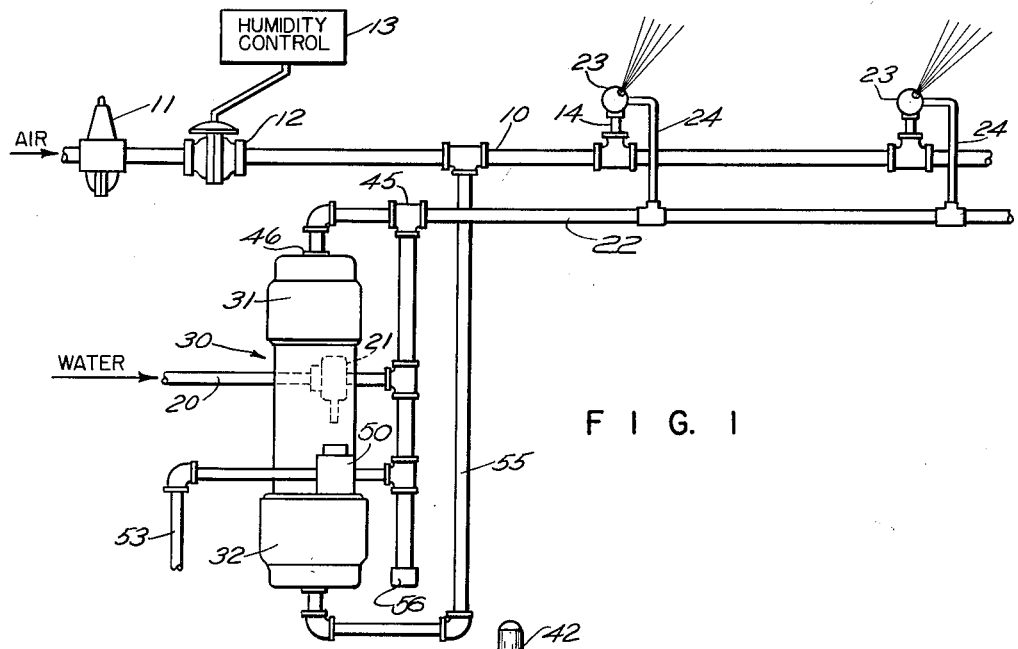
FIGURE 1 is a schematic view of a portion of a humidifying system showing the position of my invention in the system.
Figure 4:
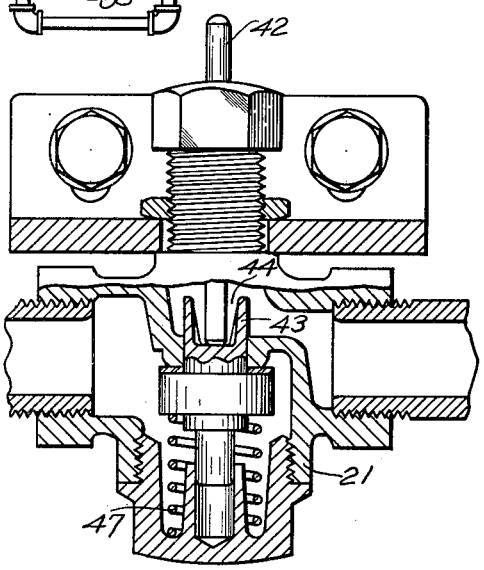
FIGURE 4 is a section of a well-known proportioning valve used as part of my invention.
Figure 3:
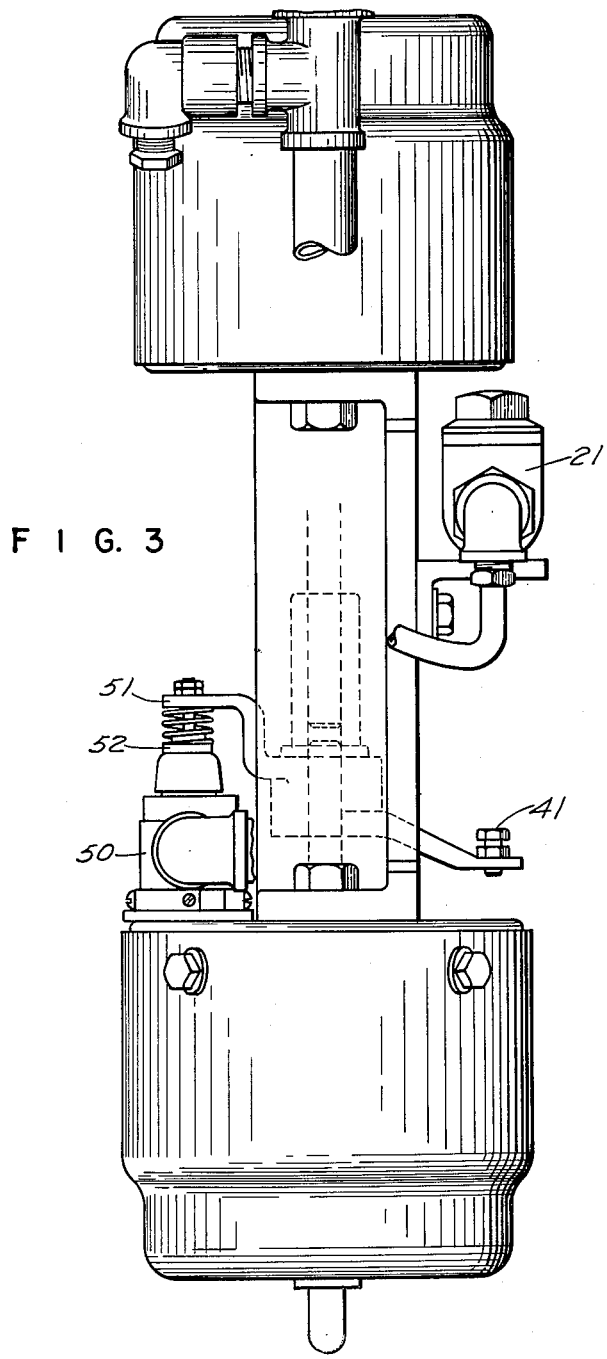
FIGURE 3 is a side elevation view of my invention.

Viewing the drawings with greater particularity it is seen that my invention participates as part of a system in which there is an air line 10 whose maximum air pressure is limited by a pressure regulator 11. At 12 is a standard blow-through valve which is opened and closed by a humidity responsive device 13 in accordance with a greater or lesser demand for moisture in the room.

Beneath the air line 10 is a water line 20 which permits water to pass through a proportional valve 21 and then on through line 22 and through laterals 24 to the atomizers 23 which are also joined to the air line through branches 14. A desirable atomizer for use in this system is described in Patent No. 2,825,602, issued March 4, 1958, to James R. Rabbitt.

The novel control for this system is shown at 30 and consists of two diaphragmed chambers or cylinder heads 31 and 32, indicated in the preferred orientation, with the water chamber 31 at the top and the air chamber 32, at the bottom. The reason for this being that the weight of the parts will encourage the drawing of water from line 22 into chamber 31 when the system is shut off and thus prevent an accidental water spurt from the nozzles 23. Each chamber is constructed essentially in a similar manner, however the cross-sectional area of the water cylinder and its diaphragm is smaller than the cross-sectional area of the air cylinder and its diaphragm. Taking the water chamber for example, there is contained a diaphragm 34 which acts as a flexible seal between the sides 35 of the chamber and a piston 36. This piston is connected to a rod 37 which extends to the other chamber 32 and is fastened to a piston 38, which is similar to the piston 36 and is sealed to the air cylinder 32 by a flexible diaphragm 39. Optionally joined to piston 38 is a spring 40 whose function will be later explained. Fastened at an appropriate point along the rod 37 is an adjustable actuating screw 41 which engages stem 42 of the proportioning valve 21. This valve is a standard Jenkins (Plain Whistle) valve which controls the flow of the water entering the system through pipe 20 by the opening or closing of a plug 43 containing uniformly shaped openings 44. The water line after leaving valve 21 diverges at the fitting 45, one leg 22 carrying water to the nozzles 23 and the other leg carrying water through the inlet 46 to the top of the cylinder head 31. A portion of this water line is also carried to a dump valve 50 which is actuated by an arm 51 fastened to the rod 37 and having a spring loaded button 52 which opens the valve under certain conditions, later to be described, to permit excess water to drain through pipe 53.

The air cylinder 32 is connected by a line 55 to the air line 10 at some point between the blow-through valve 12 and the nozzles 23.

The system containing my novel control operates as follows:

Air enters the system from a conventional source (not shown) through a pressure regulator 11 which maintains the pressure at a maximum, assumed for this case to be 30 p.s.i. A standard humidity control indicated at 13 is located at an appropriate place in the room and is connected to a blow-through valve 12. When a need is indicated to the humidity control for moisture the control opens the blow-through valve permitting the air to enter the system at the desired 30 p.s.i. This air is carried to the atomizers 23 by line 10 and the cylinder 32 by line 55. As this air, under pressure, enters the cylinder it impinges on the piston 38 and diaphragm 39 and causes the two to rise, carrying with them rod 37. Screw 41, rising with rod 37 engages stem 42 of valve 21 and progressively forces the valve open by moving the plug 43 against the force of spring 47. Water then enters the system through the valve 21 and into line 22 to the atomizers 23. The water also enters the cylinder 31 and impinges on the piston 36 and diaphragm 34 imposing a counterforce to the movement of rod 37 caused by the air pressure in cylinder 32.

In most general applications the water delivered to the valve 21 is at a much higher pressure than the desired working pressure in the system. The valve 21 therefore, in effect, acts as a reducing valve on the water. As has previously been brought out, the air cylinder 32 and its piston and diaphragm are larger in area than the water cylinder and its piston and diaphragm, the result is that the air piston 38 and rod 37 will continue to rise until a condition of equilibrium occurs between the air and water forces. This will happen when the pressure multiplied by the area on the water side equals the pressure multiplied by the area on the air. For example, if the area of the water cylinder and its piston and diaphragm is equal to 20 square inches and the area of the air cylinder and its piston and diaphragm is equal to 24 square inches and the air is entering at 30 p.s.i., then equilibrium will be reached when the water pressure is at 36 p.s.i. Since the ratio of the air to water areas is fixed for a particular construction the differential of the water and air pressures will vary by this ratio as the guiding air pressure is increased or decreased for special conditions. This gives a desirable control never before attained, for in the prior devices in which the air and water are separately controlled it is possible for the air pressure to decrease for some reason and the water pressure not decrease along with it. The result might be an extremely coarse spray or even a solid stream of water. In the one prior device wherein the differential was a preselected constant, this too could occur if the air pressure were low enough. In the present device since the differential itself varies with the increase or decrease in air pressure according to the ratio between the air and water areas, it contains a built in safety factor not contained in the other devices, because the actual differential will decrease as the controlling air pressure decreases thus preserving an acceptable spray plume.

Since the air and water cylinders which might be used in my control may not be available in a sufficient range of sizes to give the wide range of ratios that might be desired it is proposed to use a spring 40 of a preselected value to aid the piston and diaphragm in the water chamber to equalize the force of the piston and diaphragm in the air chamber. Thus the differential between water and air pressure can be decreased for a given ratio of cylinder areas depending on the size and coefficient of the spring while still deriving the benefits of the built in safety factor.

During the operation of the system the humidity control is, after a given period, satisfied in its demand for moisture and then closes the blow-through valve 12 thereby closing the air to the system and venting the system to atmosphere. When this occurs, the piston 38 and diaphragm 39 begin to descend carrying with them rod 37 and the actuator 41. This permits valve 21 to start closing, progressively reducing the water pressure in the system. The atomizers 23 which are contemplated for use in this system, namely the previously referred to atomizer of Patent No. 2,825,602, are set to close at a predetermined water pressure. Assume in this preferred case that the atomizers shut down when the water pressure is lowered to 23 p.s.i., then as the rod 37 is lowered, piston 36 and diaphragm 34 are drawn down and the pressure in line 22 is decreased as water is drawn and into cylinder 31 by the movement of diaphragm 34 and piston 36. If no air is present in the water line, a point will be reached at which a pressure lower than atmospheric will be created (in other words a vacuum) great enough to support the rod 37 and its attached pistons, diaphragms and actuators so that a state of equilibrium will occur before piston 38 is lowered to the bottom of cylinder 32, and no drainage from pipe 53 will be necessary. Moreover the system will remain primed and therefore ready for instant action when the air pressure is raised to the proper level. If, however, there is air present in the water line no state of equilibrium of rod 37 will occur before piston 38 drops to the bottom of cylinder 32 due to the expansible and compressible nature of air. To prevent any latent pressure from remaining in the water line due to the air, provision is made to drain the line by having an actuating button 52 attached to rod 37 by an arm 51 open a dump valve 50 when the rod is lowered as far as it will go. By these means, although excess water is removed from the system the system will still be primed because of water retained in cylinder 31. As an added functional feature of the system a cap 56 is provided to make possible the drainage of any solids which might be carried into the system by the water.

Although the described invention depicts my invention in a vertical orientation with the water cylinder on top it will become apparent that various modifications are contemplated and may obviously be resorted to by those skilled in the art without departing from the spirit and scope of the invention as herein defined in the appended claims.

I claim:

1. In a liquid supply system having a gas supply line and a liquid supply line wherein liquid entering said system via said liquid supply line enters at a pressure higher than that of gas entering the system via the gas supply line, apparatus for controlling the liquid pressure in the system at a higher value than the gas pressure in a desired relation to said gas pressure in the system comprising: an elongated bracket; a first chambered cylinder head fastened to one end of said bracket and having a flexible sealing diaphragm therein; a rod fastened to said diaphragm and extending from said first head substantially parallel to said bracket; a second chambered cylinder head fastened to the other end of said bracket and having a flexible sealing diaphragm therein, said rod extending into said second head and being fastened to the diaphragm therein, the cross-sectional area of said second head and its diaphragm being greater than the cross-sectional area of said first head and its diaphragm; a predictably variable valve having an inlet and an outlet fastened to said bracket substantially midway between said first and second heads and having an actuating stem thereon; an adjustable screw fastened to said rod for engaging said stem; said valve having its inlet connected to said liquid supply line; a liquid carrying pipe connected to the outlet of said valve and extending to a delivery point; said outlet pipe also extending to the end of said first head and to another valve adjacent said second chambered cylinder head; said other valve being in a biased closed position; an abutment fastened to said rod for actuating said other valve when the diaphragm in said first head is forced into an extended position thereby draining any surplus liquid from said pipe to the delivery point only after said first head is filled with liquid; said gas supply line being connected to the end of said second head and extending therefrom to said delivery point, whereby gas entering said second head will cause said second diaphragm to extend and force said rod to move toward said first head, thus carrying said adjustable screw into engagement with said actuating stem of said variable valve and opening said valve sufficiently for liquid to enter the system and impinge on said first diaphragm to an extent that the liquid pressure at the delivery point will be greater than the gas pressure at said point in the same ratio that the area of the second diaphragm is greater than the area of the first diaphragm.

2. The combination of claim 1 wherein the second head contains a linear compression coil spring of a preselected value fastened around said rod to said second diaphragm so that the force of the spring aids the force of the liquid on said first diaphragm to balance the force of the gas on the second diaphragm whereby the liquid pressure at the delivery point will be greater than the gas pressure at said point in a smaller ratio than that of the area of the second diaphragm to the area of the first diaphragm.

References Cited in the file of this patent

UNITED STATES PATENTS

| 1,619,948 | Mangiameli | Mar. 8, 1927 |
| 2,583,986 | Bahnson | Jan. 29, 1952 |